United States Patent [19]

Grasso et al.

[11] Patent Number: 5,638,204
[45] Date of Patent: Jun. 10, 1997

[54] OPTICAL POWER AMPLIFIER WITH AL$_2$O$_3$ AND ERBIUM DOPED ACTIVE FIBER

[75] Inventors: Giorgio Grasso, Monza; Aldo Righetti, Milan; Fausto Meli, Piacenza, all of Italy

[73] Assignee: Pirelli Cavi S.p.A., Milan, Italy

[21] Appl. No.: 156,880

[22] Filed: Nov. 23, 1993

Related U.S. Application Data

[63] Continuation of Ser. No. 908,425, Jun. 30, 1992, abandoned, which is a continuation of Ser. No. 643,757, Jan. 22, 1991, abandoned, which is a continuation of Ser. No. 602,364, Oct. 22, 1990, Pat. No. 5,119,229, which is a continuation of Ser. No. 891,680, May 28, 1992, Pat. No. 5,245,467, which is a continuation of Ser. No. 784,677, Oct. 29, 1991, abandoned, which is a continuation-in-part of Ser. No. 605,693, Oct. 30, 1990, abandoned, which is a continuation-in-part of Ser. No. 603,293, Oct. 26, 1990, abandoned.

[30] Foreign Application Priority Data

Jan. 22, 1990 [IT] Italy .................................. 19128/90

[51] Int. Cl.$^6$ .............................. H01S 3/00; G02B 6/10
[52] U.S. Cl. .......................... 359/341; 359/343; 372/6
[58] Field of Search .............................. 359/341, 343; 372/6

[56] References Cited

U.S. PATENT DOCUMENTS

| | | | |
|---|---|---|---|
| 3,731,226 | 5/1973 | Smitzer et al. | 372/6 |
| 4,923,279 | 5/1990 | Ainslie et al. | 359/341 |
| 4,938,556 | 7/1990 | Digonnet et al. | 350/96.15 |
| 4,959,837 | 9/1990 | Fevries et al. | 359/341 |
| 4,963,832 | 10/1990 | Desurvire et al. | 330/4.3 |
| 4,979,234 | 12/1990 | Agrawal et al. | 330/4.3 |
| 5,005,175 | 4/1991 | Desurvire et al. | 330/4.3 |
| 5,331,449 | 7/1994 | Huber et al. | 359/125 |

FOREIGN PATENT DOCUMENTS

| | | | |
|---|---|---|---|
| 0143561 | 6/1985 | European Pat. Off. | H01S 3/06 |
| 0286626 | 10/1988 | European Pat. Off. | 359/341 |
| 0345957 | 11/1989 | European Pat. Off. | H01S 3/06 |
| 0345957 | 12/1989 | European Pat. Off. | H01S 3/06 |

OTHER PUBLICATIONS

Mears et al., "Low–Noise Erbium–Doped Fibre Amplifier Operating at 1.54 um," Electronics Letters, vol. 23, pp. 1026–1028, Sep. 10, 1987.

Desurvire et al., "High–Gain Erbium–Doped Traveling–Wave Fiber Amplifier," Optics Letters, vol. 12, No. 11, pp. 588–590, Nov. 1987.

Barnes et al., "Integrated Optics and Optical Fiber Communication," IOOC '89 Technical Digest, vol. 3, pp. 24–25, Jul. 20, 1989.

Way et al., "Integrated Optics and Optical Fiber Communication," IOOC '89 Technical Digest, vol. 5, pp. 30–31, Jul. 21, 1989.

Desurvire et al., "Efficient Erbium–Doped Fiber Amplifier At A 1.53–μm Wavelength With A High Output Saturation Power," Optics Letters, vol. 14, No. 22, pp. 1266–1268, Nov. 15, 1989.

Desurvire et al., "Gain Saturation Effects In High–Speed, Multichannel Erbium–Doped Fiber Amplifiers at λ=1.53 μm," Journal of Lightwave Technology, vol. 7, No. 12, pp. 2095–2104, Dec. 1989, abstract only provided.

(List continued on next page.)

*Primary Examiner*—Nelson Moskowitz
*Attorney, Agent, or Firm*—Brooks Haidt Haffner & Delahunty

[57] ABSTRACT

An optical fiber power amplifier, particularly for telecommunication lines with optical fibers, including an active fiber doped with Erbium as a fluorescing substance, and with Al$_2$O$_3$ as refraction index modifying dopant. The fiber is pumped with a laser providing a wavelength higher than 520 nm and preferably, 980 nm. The amplifier has a particularly high amplification efficiency close to the theoretical maximum efficiency.

38 Claims, 2 Drawing Sheets

OTHER PUBLICATIONS

Becker et al., "Erbium–Doped Fiber Amplifier Pumped In The 950–1000nm Region," IEEE Photonics Technology Letters, vol. 2, No. 1, pp. 35–37, Jan. 1990.

Lidgard et al., "Output Saturation Characteristics of Erbium–Doped Fiber Amplifiers Pumped at 975 nm," Appl. Phys. Lett. 56(26), pp. 2607–2609, Jun. 25, 1990.

Pump–excited-state absorption in Erbium–doped fibers, Laming,etal Optics Letter vol. 13, No. 12 – Dec. 1988 pp. 10840–1086.

Optimal Pumping of Erbium–doped–fibre optical amplifiers, Laming, et al – Optical Communication (ECOC '88) 11–15 Sep. 1988.

Advances in Active Fibers, D.N. Payne – IOOC '89 Technical Digest, vol. 5 of 5 – Post Deadline Papers 18–21, Jul. 1989.

Optical Analysis of Erbium–doped fibres for Efficient Lasers and Amplifiers, Ainslee et al, IOOC Technical Digest,vol. 3 of 5,20 Jul. 1989.

Gain Compression in Fiber Amplifiers in the Presence of ESA, Settembre et al, pp. 502–505 ECOC, '89.

1.8Gb/s 310km Fiber Transmission without Outdoor Repeater Equipment using a Remotely Pumped In–Line Er–Doped Fiber Amplifier in an IM/direct–detection system, K. Aida et al, pp. 29–32 ECOC '89.

Erbium–Doped Fibre Amplifiers Operating at 1.5 um, Laming et al International Workshop OCTIMA 24–26 Jan. 1989.

IEEE Photonics Technology Letters, vol. 1, No. 9, Sep. 1989, pp. 267–269 IEEE, New York, NY P.C. Becker et al.

Optics Letters, vol. 14, No. 18, 15th Sep. 1989, pp. 1002–1004, Optical Society of America; L.S. Barnes et al.

Hagimoto et al – Proceeding OFC 1989 PD15-1—PD15-3.

Righetti et al – Proceedings ECOC 89 pp. 42–43.

Ainslie et al, Materials Letters, vol. 6, #5.6, Mar. 1988, pp. 139–144.

Inoue et al, Electronics Letters, vol. 25, #9, Apr. 27, 1989, pp. 594–595.

Laming et al; "Pump Excited State Absorption . . . "; Opt. Lett., vol. 13, #12; Dec. 1988, pp. 1084–1086.

Payne et al; "Rare Earth Doped Laser and Amplifiers"; ECOC 1988, 5 pages.

Barnes et al; "$Er^{3+}$–$Yb^{3+}$ and $Er^{3+}$ Doped Fiber Lasers"; Jour. Lightwave Tech., vol. 7, No. 10, Oct. 1989, pp. 1461–1465.

Desurvire et al; "Efficient Erbium–Doped . . . Saturation Power"; Opt. Lett., vol. 14, #22, pp. 1266–1268, Nov. 15, 1989; abst only supplied.

Bakker et al; "Single Pass Gain . . . Room temperatures"; Quantum Electronics, vol. QE13, #8, pp. 567–573, Aug. 1977; abst only provided.

OPTICAL POWER AMPLIFIER WITH AL₂O₃ AND ERBIUM DOPED ACTIVE FIBER

RELATED APPLICATIONS

This application is a continuation, of application Ser. No. 07/908,425, filed Jun. 30, 1992, now abandoned, which is a continuation-in-part of applications Ser. Nos. 07/602,364 filed Oct. 22, 1990 entitled Amplifier for Optical Fiber Telecommunication Lines and Optical Fiber Telecommunication Lines Incorporating Said Amplifier, now U.S. Pat. No. 5,119,229, issued Jun. 2, 1992; Ser. No. 07/603,793 filed Oct. 26, 1990 entitled Optical Fiber and Amplifier With A Samarium-Erbium Doped Active Fiber, which has been abandoned and replaced by continuing application Ser. No. 07/891,680, filed May 28, 1992, now U.S. Pat. No. 5,245,467; and Ser. No. 07/605,693 filed Oct. 30, 1990 entitled Active-Fiber Optical Amplifier and Ytterbium Doped Fiber Therefor which has been abandoned and replaced by continuing application Ser. No. 07/784,677, filed Oct. 29, 1991, now abandoned, and the disclosures of which are incorporated herein by reference; Ser. No. 07/908,425 filed Jun. 30, 1992, now abandoned; and Ser. No. 07/643,757, filed Jan. 22, 1991 now abandoned.

FIELD OF THE INVENTION

The present invention relates to an optical power amplifier with an active fiber and which has a high amplification efficiency.

BACKGROUND OF THE INVENTION

For long distance signal transmission through an optical fiber telecommunication line, it is necessary that the transmitted signals reach the receiving station at a level sufficient to allow their recognition and use. Since, in the propagation of the signals in an optical fiber, there is an attenuation of the signal light, and in order to obtain at the receiving station, which can be tens or hundreds of kilometers distant from the transmitting station, a signal of sufficient level, the signal originally introduced in the fiber must have the highest possible level.

However, the lasers used for the generation of the transmitted signal have somewhat limited power, not more than some mW, whereas more powerful lasers are not able to generate such signals. Thus, it becomes necessary to use power amplifiers which receive the signal generated by the laser and amplify it up to the desired level.

It is known that optical fibers having a core doped with particular substances, e.g. rare earth ions, provide stimulated output characteristics suitable for use as optical amplifiers.

In fact, such fibers can be supplied with a light source, called a "pumping source", at a particular wavelength corresponding to a peak of the absorption spectrum of the doping substance, which is able to bring the atoms of the doping substance in an excited energetic condition, or pumping band, from which the same atoms drop spontaneously, in very short time, to a laser output condition where they remain for a relatively longer time.

When a fiber having a high number of atoms at the excited state in the emission level is transited by a light signal having a wavelength corresponding to such laser emission state, the signal causes the transition of the excited atoms to a lower level with light emission having a wavelength the same as the wavelength of the signal. Therefore, a fiber of such kind can be used to obtain an amplification of an optical signal.

In particular, optical amplifiers using Erbium as laser-emission dopant are well known and make use of the fluorescence of the Erbium at around 1550 nm for the amplification of a signal in the fluorescence range, in which range the line fiber has the best transmission characteristics from the point of view of the attenuation of the signal.

Power optical amplifiers using fibers doped with Erbium have been described in "Proceeding ECOC (European Conference on Optical Communication) 1989", pages 42–43. Such article describes a power amplifier that uses fibers of silica doped with Germanium and Erbium and pumped with a Nd-YAG laser doubled in frequency to 532 nm.

However, such amplifier has a very low amplification efficiency, i.e. the ratio between the power of the transmission signal at the output and the supplied pumping power, lower than 20% which is very far from the maximum theoretical efficiency.

From U.S. patent application, Ser. No. 07/363,072 filed Jun. 8, 1989 and entitled "Optical Fibre Amplifier", fibers of the type doped with Al/Er are known. The dopant used to obtain the index refraction profile suitable to guide the light is $Al_2O_3$ and the fibers are suitable for optical amplifiers pumped at 514.5 nm wavelength, e.g. with an Argon laser.

According to the last-mentioned patent application, the Al/Er doped fibers are preferable to the traditional Ge/Er fibers if pumped at a wavelength of 514.5 nm because they avoid absorption phenomenon in the excited state which occurs in the Ge/Er doped fibers at such wavelength.

In order to obtain a high amplification efficiency, on the other hand, it is convenient to use relatively high pumping wavelengths, and in particular, the wavelength of 980 nm is useful because the amplification efficiency in a power amplifier is substantially proportional to the pumping wavelength.

SUMMARY OF THE INVENTION

The object of the present invention is to provide a power amplifier that has a high amplification efficiency at relatively high pumping wavelengths, i.e. substantially more than 520 nm.

The present invention relates to an optical power amplifier, comprising an active doped fiber containing $Al_2O_3$ as a refraction index modifying dopant and Erbium as fluorescent dopant, connected to an optical fiber telecommunication line and supplied with a pumping laser energy through a dichroic coupler, which amplifier can be operated in saturation conditions for the stimulated output of the fluorescent dopant.

The wavelength of the pumping laser connected to the active fiber is substantially greater than 520 nm and preferably, is equal to 980 nm.

The Erbium concentration in the fiber, expressed as weight of $Er_2O_3$ is in the range from 30 and 2000 ppm and preferably between 30 and 1000 ppm.

The active fiber can be monomodal at the wavelength of the transmission signal but not at the pumping wavelength in order to have a high pumping power inside the fiber.

Alternatively, the active fiber can be monomodal at the wavelength of the transmission signal and at the pumping wavelength, in order to reduce the connection losses with the dichroic coupler of the pumping laser.

In a preferred embodiment, the optical power amplifier according to the invention includes two pumping lasers connected to the two opposite ends of the active fiber through respective dichroic couplers oriented with the input direction of the power light emitted by the pumping laser directed toward the active fiber.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

Figure 1:
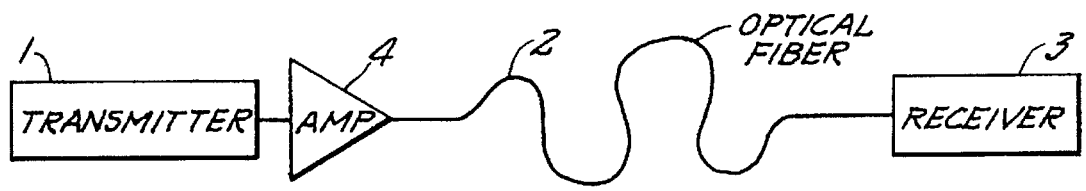
FIG. 1 is a schematic diagram of an optical telecommunication line with a power amplifier.

A telecommunication line with optical fibers, schematically represented in FIG. 1, comprises, in general, a transmitting station 1 for the emission of transmission signals, an optical fiber line 2 for carrying for long distance the signals supplied to it, and a receiving station 3 at which the signals are received.

In order to introduce into the optical fiber telecommunication line 2, optical signals which have an initial power level high enough to allow them to reach the receiving station 3, which can be located tens or hundreds kilometers from the source 1, with an acceptable power level for the proper operation of the receiving apparatus located therein after the inevitable attenuation due to the long path inside the fiber 2, the optical signals which are generated by a laser emitter present in the emission station 1 are amplified by means of a power amplifier 4.

In fact, the usable laser for the generation of the transmission signals, operating at the wavelength in which the transmission characteristics of the fiber 2 are the best, that is, in the so-called third window which is around 1500–1600 nm, are semiconductor lasers which can be modulated and have good spectral performance. However, such lasers have an output signal level somewhat low, not exceeding about 3 dBm (about 5 mW) and for this reason, the signal they generate should be amplified to a higher level, e.g. up to 15-20 dBm, before its introduction into the line 2.

To provide optical amplification of signals to be introduced into an optical fiber telecommunication line 2, power amplifiers with optical fibers are used.

Figure 2:
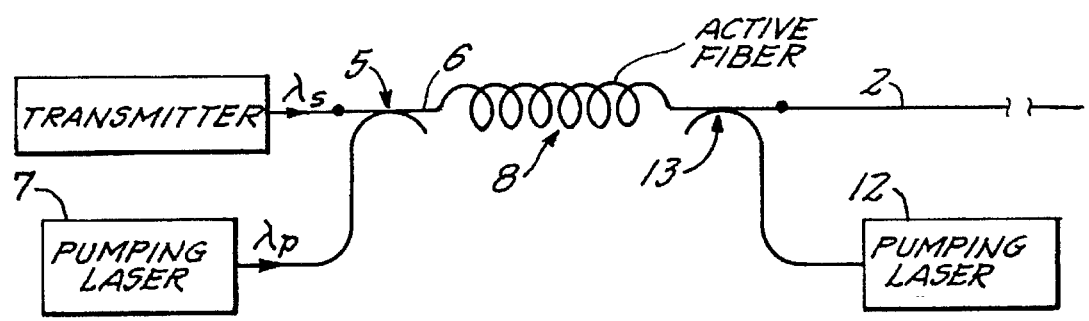
FIG. 2 is a schematic diagram of an optical power amplifier using an active fiber.

The structure of an amplifier with optical fiber is schematically illustrated in FIG. 2. A transmission signal, having a wavelength $\lambda_s$, is transmitted to a dichroic coupler 5 where it is joined on a single outgoing fiber 6 with a pumping signal with a wavelength $\lambda_p$ generated by a pumping laser 7. An active fiber 8 of a selected length which is connected to the fiber 6, at the output of the coupler 5, constitutes the amplifier of the signal which is introduced into the line fiber 2 to be dispatched toward its destination.

In general, an optical amplifier of the described type uses an active optical fiber 8 doped with $Al_2O_3$ in solution with $Er_2O_3$ which permits the obtaining of an amplification of the transmission signal by exploiting the stimulated transitions of Erbium.

Figure 3:
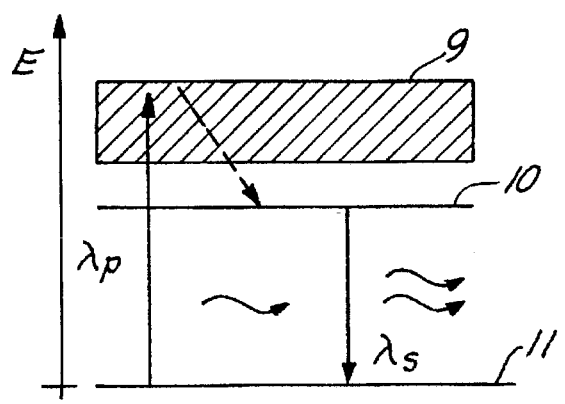
FIG. 3 is a diagram of the energy transitions in a fiber of an amplifier according to the diagram of FIG. 2, which is suitable to generate a stimulated (laser) output.

As shown in the diagram of FIG. 3, which represents in symbolic way the available energetic condition for one Erbium ion in solution in the siliceous matrix of the fiber, the introduction into the active fiber of a light power at the pumping wavelength $\lambda_p$, lower than that $\lambda_s$ of the transmission signal, raises a certain number of ions $Er^{3+}$ present as a doping substance in the fiber glass matrix to an excited energy state 9, or "pumping" band, from which the ions drop spontaneously to an energy level 10 which is a laser emission level.

In the laser level 10, the $Er^{3+}$ ions can remain for a relatively long time before undergoing a spontaneous transition to the base level 11.

As known, while the transition from the band 9 to the level 10 is associated with a thermal output, which is dispersed to the exterior of the fiber (phononic radiation), the transition from the level 10 to the base level 11 generates a light emission, consisting of a photon with a wavelength corresponding to the energy value of the laser emission level 10. If a fiber containing a high quantity of ions at the laser emission level 10 is transited by a signal with wavelength corresponding to such emission level, the signal causes the stimulated transition of the ions from the emission level 10 to the base level 11 before they decay spontaneously. Such transition is associated with a corresponding output of photons in phase with the photons of the signal giving rise to a "waterfall" phenomenon which produces, at the output from the active fiber 8, the emission of a strongly amplified transmission signal.

In the presence of signals input to the active fiber with a low power level, for example, a signal that has been attenuated after traveling a long distance inside an optical fiber and in conditions of low output powers, the light power $P_u$ of the transmission signal with wavelength $\lambda_s$ at the output of the active fiber is proportional to the power $P_i$ of the signal input to the fiber, and the constant of proportionality between them is defined as gain of amplification G, according to the relation $P\mu = G\ P_i$.

Such operating conditions are typical of line amplifiers placed along an optical fiber of a telecommunication line to restore to a sufficient level a signal attenuated after a certain path in the fiber.

In presence of a high power input signal and with high output power, substantially more than 5% of the pumping power introduced, the optical amplifier operates in saturation conditions and yields an output power which, practically, does not depend on the input power, and instead, depends solely on the pumping power. In fact, in the presence of a great number of photons inside the active fiber, the capacity of the fiber to emit new photons due to stimulated transitions at the level laser 10 is limited by the possibility, correlated to the pumping power introduced, of making available a sufficient number of Erbium ions in the laser level 10, and it does not depend on the number of photons of input signal, that is, on the input power into the fiber.

Such operating conditions are typical of the power amplifiers and for them we have a relation $P_u = K\ P_p$, where $P_u$ is the output power, $P_p$ the pumping power and K a proportionality constant that essentially represents the efficiency of the amplifier.

The maximum efficiency of the amplifier is theoretically the efficiency corresponding to the situation in which, for each photon supplied inside the fiber at the pumping wavelength $\lambda_p$, which causes a transition of the dopant from the base level 11 to the laser level 10, there is a photon emission, in presence of signal, at the transmission wavelength $\lambda_s$. Such conditions correspond to an amplification efficiency, or "Quantum Efficiency", that is, an efficiency which is the ratio between the energy of the photon at output and the energy of the photon at input, or between the wavelength of the input photon, that is, the pumping photon, and the wavelength of the output photon, that is, the transmission photon, and hence, $E_q=\lambda_p/\lambda_s$.

In the case of wavelength of the transmission signal of about 1550 nm and of pumping wavelength of 980 nm the quantum efficiency is about 63% (980/1550).

Therefore, in order to obtain a high amplification efficiency, it is necessary to operate in corresponding conditions, with high quantum efficiency, using pumping wavelengths relatively high and furthermore, to approach as much as possible the quantum efficiency.

In particular, the use of low pumping wavelengths, substantially lower than 520 nm, gives a very low quantum efficiency (lower than 33%) and a very poor amplification efficiency even, in the better of the cases, when using amplifiers having an efficiency equal to the quantum efficiency.

For the realization of power amplifier of the type above described, we have discovered that active silica fibers, doped with $Al_2O_3$ to obtain the desired index refraction profile and containing Erbium as dopant with laser emission, present a very high efficiency, close to the quantum efficiency above described, when the pumping wavelength is higher than 520 nm, and in particular corresponds to the absorption peak of the Erbium at 980 nm.

The above described fibers are obtained with the technique of solution doping, well known in the art, through which the principal dopant, that is, $Al_2O_3$, and the fluorescent dopant, that is, $Er^{3+}$, are incorporated in the core of the fiber by immersion, in an aqueous solution containing corresponding salts, a tubular preform, having one internal sintered layer, which is then fused and collapsed, drawing the fiber from it.

The description of such kind of fibers and of the relative forming method is disclosed in said U.S. patent application Ser. No. 07/363,072 now U.S. Pat. No. 5,282,079.

For the realization of power amplifiers, according to the present invention, the fibers doped with $Al_2O_3$ contain an Erbium quantity, expressed as concentration by weight of $Er_2O_3$, between 30 ppm and 2000 ppm and preferably between 30 and 1000 ppm. The content of the refraction index modifying dopant, that is $Al_2O_3$, and the radial profile of the refraction index in the fiber can be chosen in basis of the specific requirements of the application and are not a condition to the purposes of the present invention. The $Al_2O_3$ content in the fiber core can, for example, be in the range from 5–15% in weight.

In particular, the numerical aperture and the mode diameter of the fiber are chosen in such a way to provide a coupling with low loss with the line fiber, while the Erbium content and its radial distribution in the fiber can be chosen in correlation with the length of the chosen active fiber, the input power and the like, according to known criteria.

The active fiber is a fiber monomodal at the transmission wavelength, but it should not be monomodal at the pumping wavelength for the purpose of providing the input into the fiber of the greatest possible quantity of pumping power distributed in the fiber. The use of a fiber monomodal at the pumping wavelength $\lambda_p$ can be convenient, however, to simplify and to reduce the connection losses of the fiber with the dichroic coupler 5.

With such fibers, it is possible to produce a power amplifier according to the diagram illustrated in FIG. 2 and in the previous description. For the purpose of maintaining a high value of the pumping power for the entire length of the active fiber 8 and to increase the total pumping power introduced in the fiber 8, it is possible to provide a second pumping laser 12 downward of the active fiber 8 with a dichroic coupler 13 oriented toward the fiber 8. This latter allows the use of a pumping laser at not too high a power in order not to get related degradation of the signal while supplying all the necessary power to the active fiber 8.

The use of a fiber doped with $Al_2O_3$ and $Er^{3+}$, pumped at 980 nm ($\pm 5$ nm), has enabled the obtaining of a very high amplification efficiency, close to the above-described quantum efficiency, and, in any event, higher than 60% of such value. The traditional fibers doped with Germanium have shown, instead, a very low efficiency, lower than 30% of the quantum efficiency.

Figure 4:
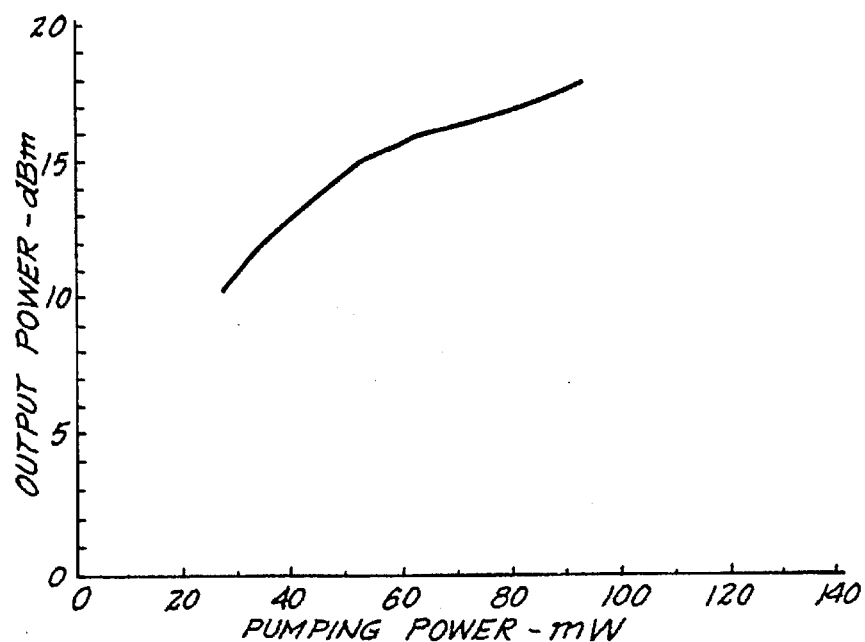
FIG. 4 is a graph of the output power with respect to the pumping power in a power amplifier using an active fiber according to the invention.

FIG. 4 is a graph of the output power $P_u$ as a function of the pumping power $P_p$ for an amplifier using a fiber according to the invention (Al/Er). The fiber had the following characteristics:

Numerical Aperture—0.16
Erbium content (weight of $Er_2O_3$)—350 ppm
Cut-off wavelength ($\lambda_{cut-off}$)—930 nm
Mode Field Diameter (MFD) at 1536 nm—8.14 μm At the amplifier input, the power of the transmission signal, having a wavelength $\lambda_s=1356$ nm, was $P_i=-2$ dBm. The pumping wavelength was $\lambda_p=980$ nm and the active fiber had length of 3.7 m.

In such conditions, we have obtained an amplification efficiency substantially equal to the quantum efficiency.

Figure 5:
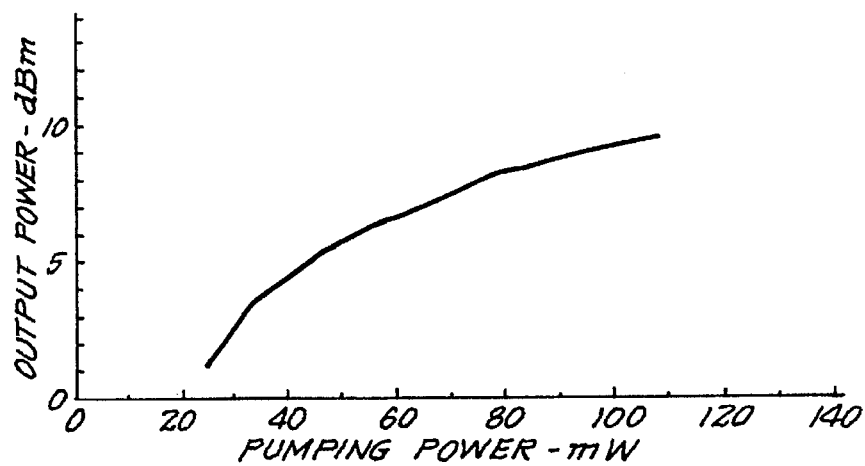
FIG. 5 is a graph of the output power versus the pumping power in a power amplifier using a Ge/Er type active fiber.

In comparison, FIG. 5 is a graph of the output power $P_u$ versus the pumping power $P_p$ for an amplifier using a traditional fiber (Ge/Er). The fiber had the following characteristics:

Numerical Aperture—0.21
Erbium content (weight of $Er_2O_3$)—300 ppm
Cut-off wavelength ($\lambda_{cut-off}$)—980 nm
Mode Field Diameter (MD) at 1536 nm—5.82 um At the amplifier input, the power of the transmission signal, having a wavelength $\lambda_s=1536$ nm, was $P_i=0$ dBm. The pumping wavelength was $\lambda_p=980$ nm and the active fiber had length of 4 m.

The obtained amplification efficiency was, in this case, 16%, and hence, about equal to 25% of the quantum efficiency.

By comparing the graphs of FIGS. 4 and 5, it is apparent that the fiber Al/Er provides a better performance than the fiber Ge/Er.

Figure 6:
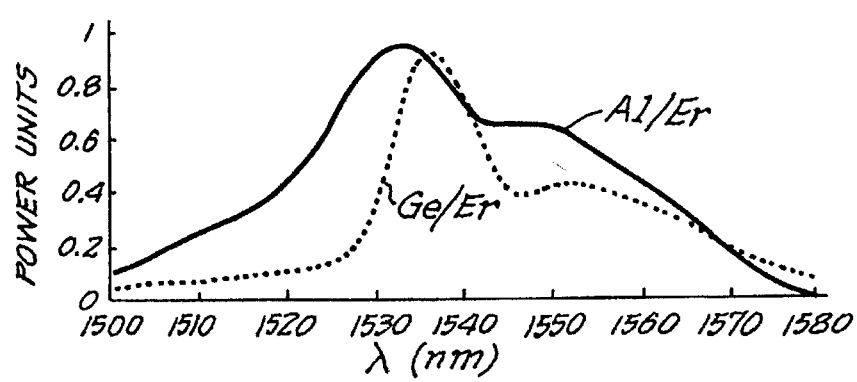
FIG. 6 illustrates the fluorescence spectra of a fiber according to the invention and of a Ge/Er fiber.

A fiber Al/Er presents a fluorescence spectrum broader than the one of a corresponding fiber Ge/Er, as shown by the respective curves Al/Er and Ge/Er in FIG. 6. This makes such active fibers a source of greater noise as compared to the fibers Ge/Er and is due to the spontaneous decay of the Erbium ions with wavelengths different from the signal lengths, when used as line amplifiers, i.e. with low output power as compared to the pumping power.

However, for use as power amplifiers, we have observed that the fibers Al/Er do not present significant noise output as compared to the fibers Ge/Er. It is considered that this is due to the fact that in the saturation condition previously described in which a power amplifier operates, in the Al/Er fibers, substantially all Erbium ions brought to the lasing level are made to decay to the base level by a photon of the signal, which confirms the amplification efficiency close to the quantum efficiency shown by such fibers. Accordingly, there is practically no spontaneous ion decaying, a noise cause, and furthermore, such noise is negligible in any case because of the level of the output power of the signal.

The widening of the fluorescence spectrum of the fiber also has the advantage of permitting a greater selection liberty for the wavelength of the transmission signal, allowing, for example, a wider production tolerance for the signal laser.

The fibers according to the invention are particularly advantageous for the use in optical fiber power amplifiers, offering an amplification efficiency substantially higher than the known fibers.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber telecommunication system comprising:
   an optical fiber power amplifier having an input and an output and comprising an active fiber having a core and a cladding, said core being doped with dopants consisting essentially of Erbium and $Al_2O_3$, said active fiber being pumpable by pumping light energy and being operable in saturation conditions with light energy at a wavelength in the range of 1500 nm to 1600 nm and of a predetermined power level supplied to said input of said amplifier, the output power of said amplifier being proportional to, and greater than 5% of, the power of said pumping light energy in said saturation conditions;
   an optical signal transmitter supplying a communication light signal at a wavelength in the range from 1500 nm to 1600 nm coupled to said input of said amplifier and supplying said communication light signal to said input at at least said predetermined power level whereby said amplifier operates in saturation conditions;
   pumping light power means coupled to said active fiber and supplying pumping light power at a wavelength of about 980 nm to said active fiber, the pumping light power causing amplification efficiency to exceed about 60% of quantum efficiency for the amplifier, the quantum efficiency equalling a ratio of the pumping light power wavelength to the communication light signal wavelength, and the amplification efficiency equalling a ratio of the amplifier output power to the pumping light power; and
   an optical receiving station coupled to said output of said amplifier.

2. Method for generating optical telecommunication signals at a wavelength in the range of 1500 nm to 1600 nm with an optical power amplifier, said method comprising the steps of:
   generating a light signal having a power greater than a predetermined value, at a wavelength in the range of from 1500 to 1600 nm;
   providing an optical power amplifier, comprising an input, an output and an active fiber having a core doped with dopants consisting essentially of Erbium and $Al_2O_3$;
   supplying said light signal to said input of said optical amplifier;
   supplying pumping power to said active fiber of said optical amplifier at a wavelength of about 980 nm and at a predetermined pump power level thereby causing said light signal to be amplified at an output power value;
   said power of said light signal being of a magnitude which causes said optical amplifier to operate normally in saturation condition, in which said output power value of the optical amplifier is substantially more than 5% of said pump power and does not practically depend on said power of said light signal.

3. An optical fiber telecommunication system as set forth in claim 1 wherein the Erbium concentration in said active fiber, in parts by weight, is in the range from 30 to 2000 parts per million.

4. An optical fiber telecommunication system as set forth in claim 3 wherein the $Al_2O_3$ content of the fiber, in parts by weight, is in the range from 5% to 15%.

5. An optical fiber telecommunication system as set forth in claim 1 wherein the Erbium concentration in said active fiber, in parts by weight, is in the range from 30 to 1000 parts per million.

6. An optical fiber telecommunication system as set forth in claim 1 wherein said active fiber is monomodal at said fluorescent wavelength but not at said wavelength of said pumping power.

7. An optical fiber telecommunication system as set forth in claim 1 wherein said active fiber is monomodal at both said fluorescent wavelength and said wavelength of said pumping power.

8. An optical fiber telecommunication system as set forth in claim 1, wherein said optical signal transmitter is connected to said input of said optical amplifier and said pumping means is coupled to said active fiber by a dichroic coupler having an output and two inputs, said dichroic coupler having its output coupled to said input of said optical amplifier, said optical signal transmitter being connected to one of said inputs of said dichroic coupler and said pumping means being coupled to the other of said inputs of said dichroic coupler and further comprising a further dichroic coupler having an output and an input, said output of said further dichroic coupler being coupled to said output of said active fiber and a further said pumping means coupled to said input of said further dichroic coupler for applying further pumping power to said active fiber.

9. An optical fiber telecommunication system comprising:
   an optical fiber power amplifier, comprising an active fiber having a core and a cladding, the core being doped with dopants consisting essentially of erbium and $Al_2O_3$;
   an optical signal transmitter supplying a communication light signal to an input of the amplifier, the communication light signal having a wavelength in a range from about 1500 nm to about 1600 nm and a power level of sufficient magnitude to cause the amplifier to operate in saturation;
   a pump source supplying pumping light power at a wavelength of about 980 nm to the amplifier, causing the amplifier to amplify the power of the communication light signal at an amplifier output, and, together with the power level of the communication light signal and the active fiber dopants, causing amplification efficiency to exceed about 60% of quantum efficiency for the amplifier, the quantum efficiency equalling a ratio of the pumping light wavelength to the communication light signal wavelength, and the amplification efficiency equalling a ratio of the amplifier output power to the pumping light power; and an optical receiving station coupled to the amplifier output.

10. The optical fiber telecommunication system of claim 9, wherein the amplification efficiency is substantially equal to the quantum efficiency.

11. The optical fiber telecommunication system of claim 9, wherein normal operation of the amplifier is in saturation.

12. The optical fiber telecommunication system of claim 9, wherein the amplifier operates only in saturation with respect to the communication light signal.

13. The optical fiber telecommunication system of claim 9, wherein the amplifier operates only in saturation.

14. The optical fiber telecommunication system of claim 9, wherein the amplifier has a length, and at least a portion of the length operates only in saturation.

15. An optical fiber power amplifier comprising:

an active fiber having an input and an output and being doped with dopants consisting essentially of erbium and $Al_2O_3$, the active fiber receiving an optical signal through the input, the optical signal having a wavelength in a range from about 1500 nm to about 1600 nm and a power level of sufficient magnitude to cause the active fiber to operate in saturation; and a pump source supplying pumping light power at a wavelength of about 980 nm to the active fiber, causing the active fiber to amplify the power of the optical signal at the active fiber output, and, together with the power level of the signal and the active fiber dopants, causing amplification efficiency to exceed about 60% of quantum efficiency for the active fiber, the quantum efficiency equalling a ratio of the pumping light wavelength to the optical signal wavelength, and the amplification efficiency equalling a ratio of the active fiber output power to the pumping light power.

16. The optical fiber power amplifier of claim 15, wherein the amplification efficiency is substantially equal to the quantum efficiency.

17. The optical fiber power amplifier of claim 15, wherein normal operation of the active fiber is in saturation.

18. The optical fiber power amplifier of claim 15, wherein the active fiber operates only in saturation with respect to the optical signal.

19. The optical fiber power amplifier of claim 15, wherein the active fiber operates only in saturation.

20. The optical fiber power amplifier of claim 15, wherein the amplifier has a length, and at least a portion of the length operates only in saturation.

21. A method for amplifying an optical telecommunication signal with an optical fiber power amplifier, said method comprising the steps of:

supplying an optical signal to an input of the optical fiber power amplifier, the amplifier comprising an active fiber having a core doped with dopants consisting essentially of erbium and $Al_2O_3$, the optical signal having a wavelength in a range from about 1500 nm to about 1600 nm and a power level of sufficient magnitude to cause the active fiber to operate in saturation; and simultaneously supplying pumping light power to the active fiber at a wavelength of about 980 nm, causing the active fiber to amplify the power of the optical signal at the active fiber output, and, together with the power level of the optical signal and the active fiber dopants, causing amplification efficiency to exceed about 60% of quantum efficiency for the active fiber, the quantum efficiency equalling a ratio of the pumping light wavelength to the optical signal wavelength, and the amplification efficiency equalling a ratio of the active fiber output power to pumping light power.

22. The amplifying method of claim 21, the step of supplying pumping light power causing the amplification efficiency to be substantially equal to the quantum efficiency.

23. The amplifying method of claim 21, the step of supplying an optical signal causing the active fiber to operate normally in saturation.

24. The amplifying method of claim 21, the step of supplying an optical signal causing the active fiber to operate only in saturation with respect to the optical signal.

25. The amplifying method of claim 21, the step of supplying an optical signal causing the active fiber to operate only in saturation.

26. The amplifying method of claim 21, wherein the amplifier has a length, and the step of supplying an optical signal causes at least a portion of the length to operate only in saturation.

27. An optical fiber telecommunication system comprising:

an optical fiber power amplifier comprising an active fiber having a core and a cladding, the core being doped with erbium as a fluorescing dopant and $Al_2O_3$ as an index modifying dopant, said active fiber having an input and an output;

a pump source coupled to said active fiber and supplying pumping light at a predetermined power level and at a wavelength of about 980 nm to said active fiber;

an optical signal transmitter supplying a communication light signal to said input of said active fiber, said communication light signal having a wavelength in the range from about 1500 nm to about 1600 nm and a power level sufficient to drive said active fiber into saturation, and said active fiber providing amplified communication light signal power at said output of said active fiber which is substantially independent of the communication light signal power supplied to said input of said active fiber; and said $Al_2O_3$ dopant being present in said core in an amount sufficient, together with the power levels of the communication light signal and the pumping light, to cause amplification efficiency to exceed about 60% of quantum efficiency for the amplifier, the quantum efficiency equalling a ratio of the wavelength of the pumping light to the wavelength of the communication light signal, and the amplification efficiency equalling a ratio of the amplified communication light signal power at said output of said active fiber to said power level of said pumping light.

28. The optical fiber telecommunication system of claim 27, wherein the amplification efficiency of the optical fiber power amplifier is substantially equal to the quantum efficiency.

29. The optical fiber telecommunication system of claim 27, wherein normal operation of the active fiber is in saturation.

30. The optical fiber telecommunication system of claim 27, wherein the active fiber operates only in saturation with respect to the communication light signal.

31. The optical fiber telecommunication system of claim 27, wherein the active fiber operates only in saturation.

32. The optical fiber power amplifier of claim 27, wherein the amplifier has a length, and at least a portion of the length operates only in saturation.

33. An optical fiber power amplifier comprising:

an active fiber having a core and a cladding, the core including erbium and $Al_2O_3$, the active fiber receiving an optical signal through an input, the optical signal having a wavelength in a range from about 1500 nm to about 1600 nm and a power level of sufficient magnitude to cause the active fiber to operate in saturation; and a pump source supplying pumping light power at a wavelength of about 980 nm to the active fiber and causing the active fiber to amplify the power of the communication light signal at the active fiber output; and the $Al_2O_3$ being present in the core in an amount sufficient, together with the power level of the optical signal and the pumping light power, to cause amplification efficiency to exceed 60% of quantum efficiency for the active fiber, the quantum efficiency equalling a ratio of the pumping light wavelength to the optical signal wavelength, and the amplification efficiency equalling a ratio of the active fiber output power to the pumping light power.

34. The optical fiber power amplifier of claim 33, wherein the amplification efficiency is substantially equal to the quantum efficiency.

35. The optical fiber power amplifier of claim 33, wherein normal operation of the active fiber is in saturation.

36. The optical fiber power amplifier of claim 33, wherein the active fiber operates only in saturation with respect to the optical signal.

37. The optical fiber power amplifier of claim 33, wherein the active fiber operates only in saturation.

38. The optical fiber power amplifier of claim 33, wherein the amplifier has a length, and at least a portion of the length operates only in saturation.

* * * * *

UNITED STATES PATENT AND TRADEMARK OFFICE
CERTIFICATE OF CORRECTION

PATENT NO. : 5,638,204
DATED : June 10, 1997
INVENTOR(S) : Grasso, et. al.

It is certified that error appears in the above-identified patent and that said Letters Patent is hereby corrected as shown below:

Title page, item [63], under Related U.S. Application Data, last line should read --603,793--.

Signed and Sealed this

Second Day of June, 1998

*Attest:*

BRUCE LEHMAN

*Attesting Officer*     Commissioner of Patents and Trademarks